March 11, 1952

J. F. MORSE 2,588,649

COMBINED THROTTLE AND CLUTCH
CONTROL FOR MARINE ENGINES

Filed March 18, 1948

INVENTOR
JOHN F. MORSE

By Clyo Frye

ATTORNEYS

March 11, 1952
J. F. MORSE
2,588,649
COMBINED THROTTLE AND CLUTCH
CONTROL FOR MARINE ENGINES
Filed March 18, 1948
4 Sheets-Sheet 2
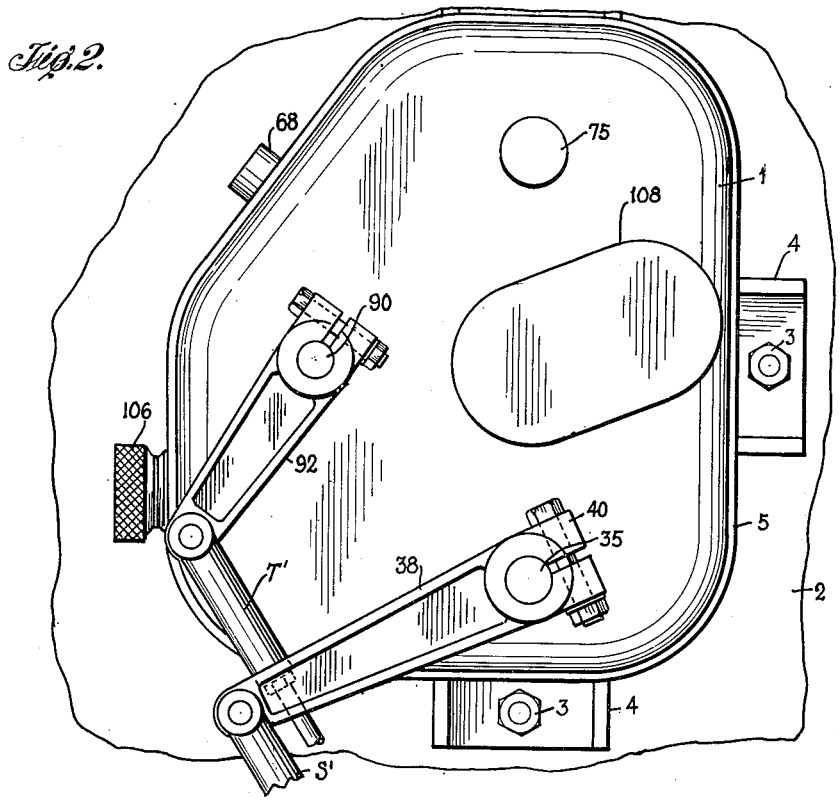
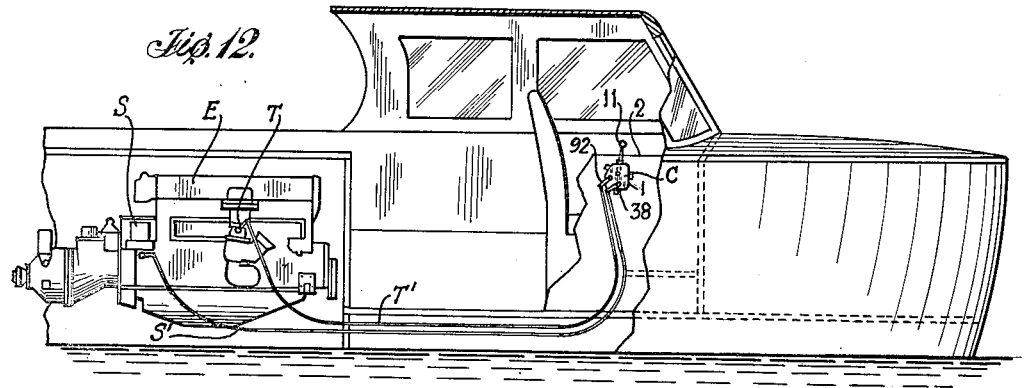
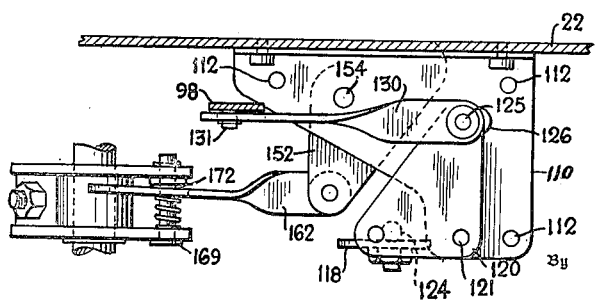
Inventor
JOHN F. MORSE
Attorneys

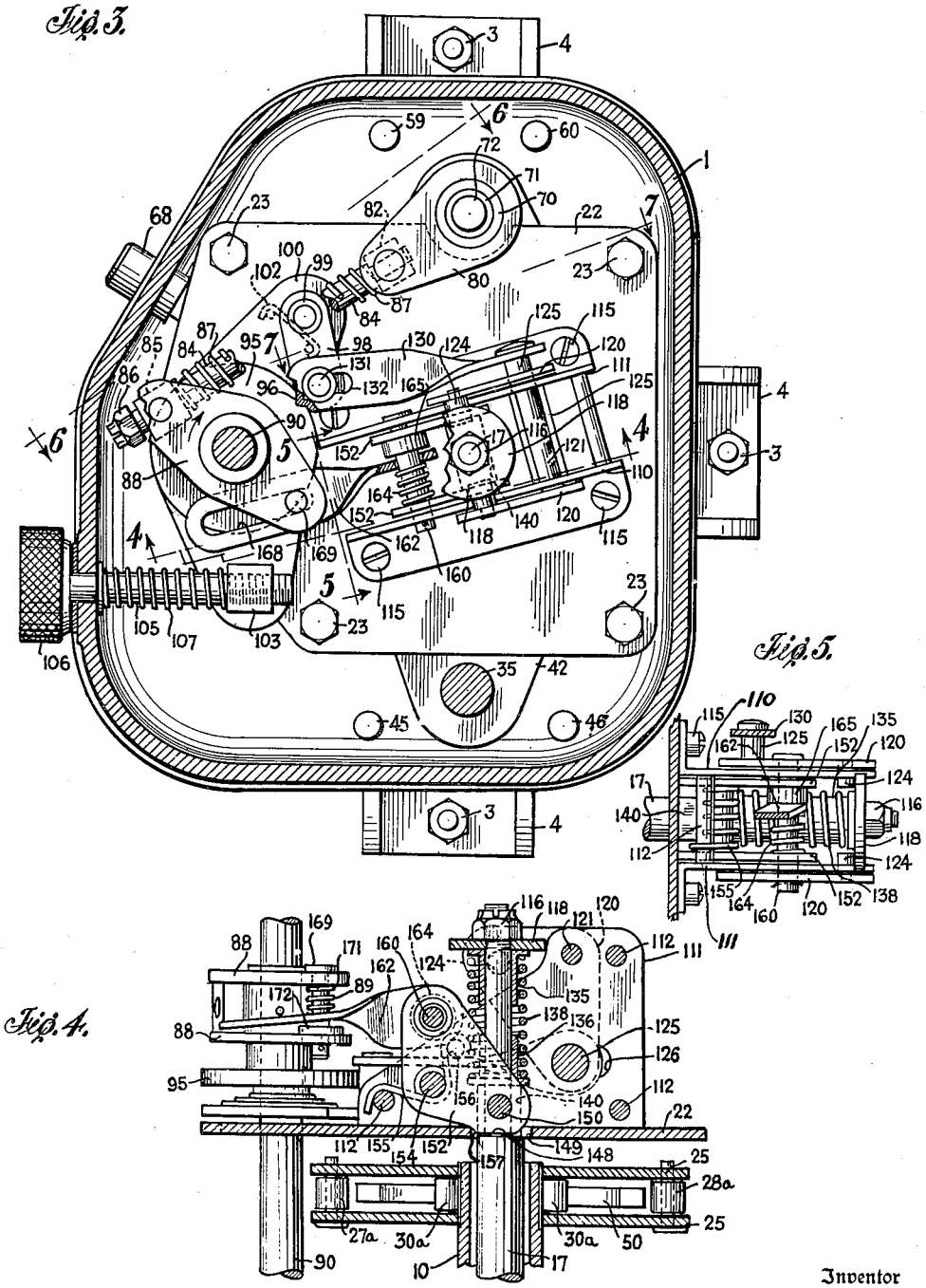

March 11, 1952
J. F. MORSE
2,588,649
COMBINED THROTTLE AND CLUTCH CONTROL FOR MARINE ENGINES
Filed March 18, 1948
4 Sheets-Sheet 4
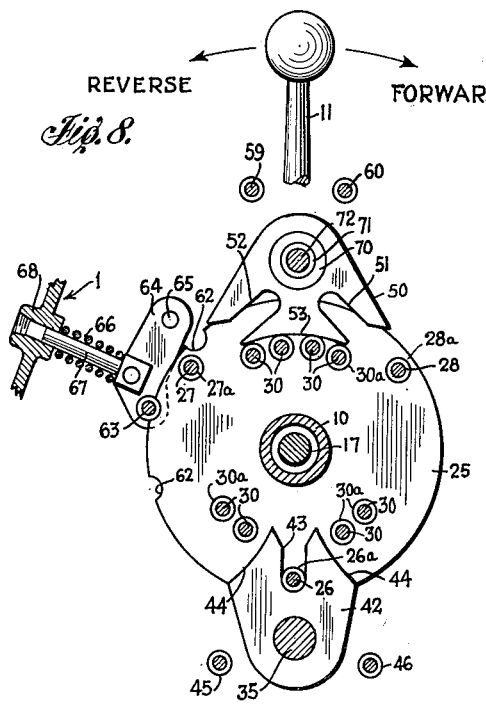
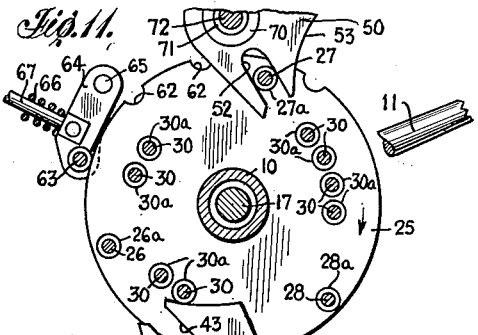
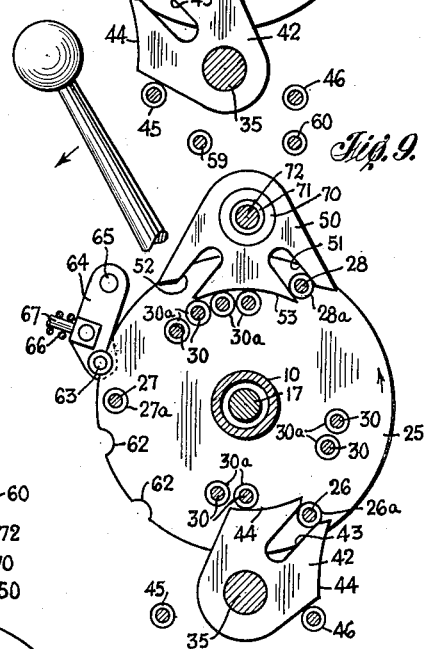
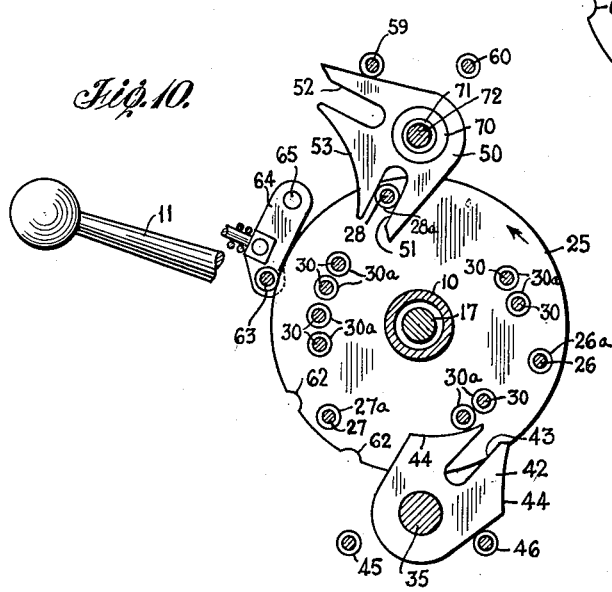
Inventor
JOHN F. MORSE
Attorneys Patented Mar. 11, 1952

2,588,649

UNITED STATES PATENT OFFICE 2,588,649

COMBINED THROTTLE AND CLUTCH CONTROL FOR MARINE ENGINES

John F. Morse, Hudson, Ohio

Application March 18, 1948, Serial No. 15,546

31 Claims. (Cl. 74—472)

The present invention relates to a control device particularly adapted for marine engines, although it is not necessarily confined thereto but may have other adaptations and uses. The purpose of the invention is to provide a single, manually operated lever, by which the pilot may with one instrumentality control both the throttle and the reverse gear of the engine.

This achievement has been made practical by the recent advent of hydraulic or other types of servo-motors for actuating the reverse gear of a marine engine because the force required to shift a reverse gear equipped with power-operated means of this type is of the same order as that required to operate the throttle-control mechanism and it is therefore possible to operate both instrumentalities with the pressure exerted by a finger.

The mechanism shown and described herein is superior to any mechanism which has been previously developed for this purpose. One of the principal advantages is that it provides for special conditions which obtain in the operation of power craft. In shifting from forward to reverse, it is necessary to slow down the engine, but if the engine is slowed down during this operation to normal idling speed, it will frequently stall and this occurs almost invariably if the shift is made rapidly. Oftentimes in the operation of a power boat it is necessary to stop or reverse the direction of the boat quickly to avoid collision with an obstacle that looms up ahead suddenly. The only way in which a power boat may be brought to a quick stop is to reverse the engine and under such circumstances the engine is called upon not only to reverse the torque of the propeller, but also to overcome the slip-stream effect against the propeller while the boat is still moving forwardly.

If, under the conditions stated, the speed of the engine is dropped back to the normal idling speed, the engine does not have enough power to resist these forces and it will stall, as a result of the load placed upon it.

To overcome these conditions and to insure that the engine will not stall, means are provided which will accelerate the engine above the normal idling speed at the time the reverse gear is shifted from forward to reverse, or reverse to forward. This is what is termed herein as "high-idling" speed and is somewhat above the normal-idling speed but still less than a normal-cruising speed, the increment above normal or "low-idling" which is low enough to permit the reverse gear to operate and at the same time sufficient to insure that the engine does not stall when subjected to the extremely severe conditions imposed upon it by the most rapid reversal of the propeller.

While it has been known that it is desirable to provide for a somewhat-accelerated idling-speed during the operation of the reverse gear, and in my application Serial No. 644,033 filed January 29, 1946, I have disclosed mechanism for insuring a high-idling speed of the engine in connection with a single-stick control for the reverse gear and the rudder, the present invention is for a combination of throttle-control and reverse-gear control which will accomplish a like purpose. A combination to attain this result creates some special problems which have been overcome.

Other than as shown in my said prior application, I am not aware of any device which coordinates a throttle- and reverse-gear control in a single-lever mechanism which will automatically insure that the speed of the engine is maintained during shifting at a point so that it will not stall.

It has been found that a high-idling speed of from 300 to 400 R. P. M. above normal-idling speed will be sufficient to insure that the engine does not stall, but the mechanism provides for adjusting the idling speed to suit the requirements of any power plant.

It is desirable to provide for a low-idling speed as well as for a high-idling speed, the low speed being used to keep the engine running when the boat is docked or where very low speeds are required, and for this purpose the combination provides that when the lever is moved in a certain fashion the means for holding the engine at high-idling speed will be released.

The combination of elements shown and described herein will also permit the pilot to have full control of throttle independently of the reverse gear so that he can vary the speed of the engine either in forward or reverse by a further manipulation of the control lever.

The mechanism therefore gives the pilot complete manual control of the power plant of the boat through a single-lever control and at the same time prevents stalling of the engine during reversal. This combination greatly facilitates the operation and maneuvering of boat and adds immeasurably to the safety of operation.

The mechanism shown and described herein is not costly and does not easily get out of order. It has other advantages over previous controls of this type and, while the invention is shown in its best-known and preferred form, it is subject to variations and modifications and may be improved upon without in any way departing from the essential features of the invention.

In the drawings which show a practical embodiment of the invention, as demonstrated by actual use in experimental boat installations:

Fig. 2 is a rear view of the control unit;

Fig. 3 is a view on the line 3—3 looking toward the left in Fig. 1, the cover of the control unit being removed;

Fig. 4 is a section on the line 4—4 of Fig. 3 looking upwardly as indicated by the arrows;

Fig. 5 is a section on the line 5—5 of Fig. 3;

Fig. 7 is a section on the line 7—7 of Fig. 3;

Fig. 8 is a side view of the cam mechanism which actuates the lever arm for the throttle-control mechanism and the clutch control for the reverse-gear mechanism. In this view the parts are in neutral, as is shown by the vertical position of the control lever;

Fig. 9 is like Fig. 8 but showing the parts in the position they assume when the reverse gear is fully engaged. In this view the clutch-control arm has been moved in a counterclockwise direction for shifting movement toward reverse but the throttle has not been opened;

Fig. 10 is a view showing the parts in full reverse with the throttle fully opened;

Fig. 11 shows the position of the mechanism when the engine is going at full speed forward; and Fig. 12 is a side view of a typical power boat showing the relation of the control unit to the engine.

Figures 1, 6:
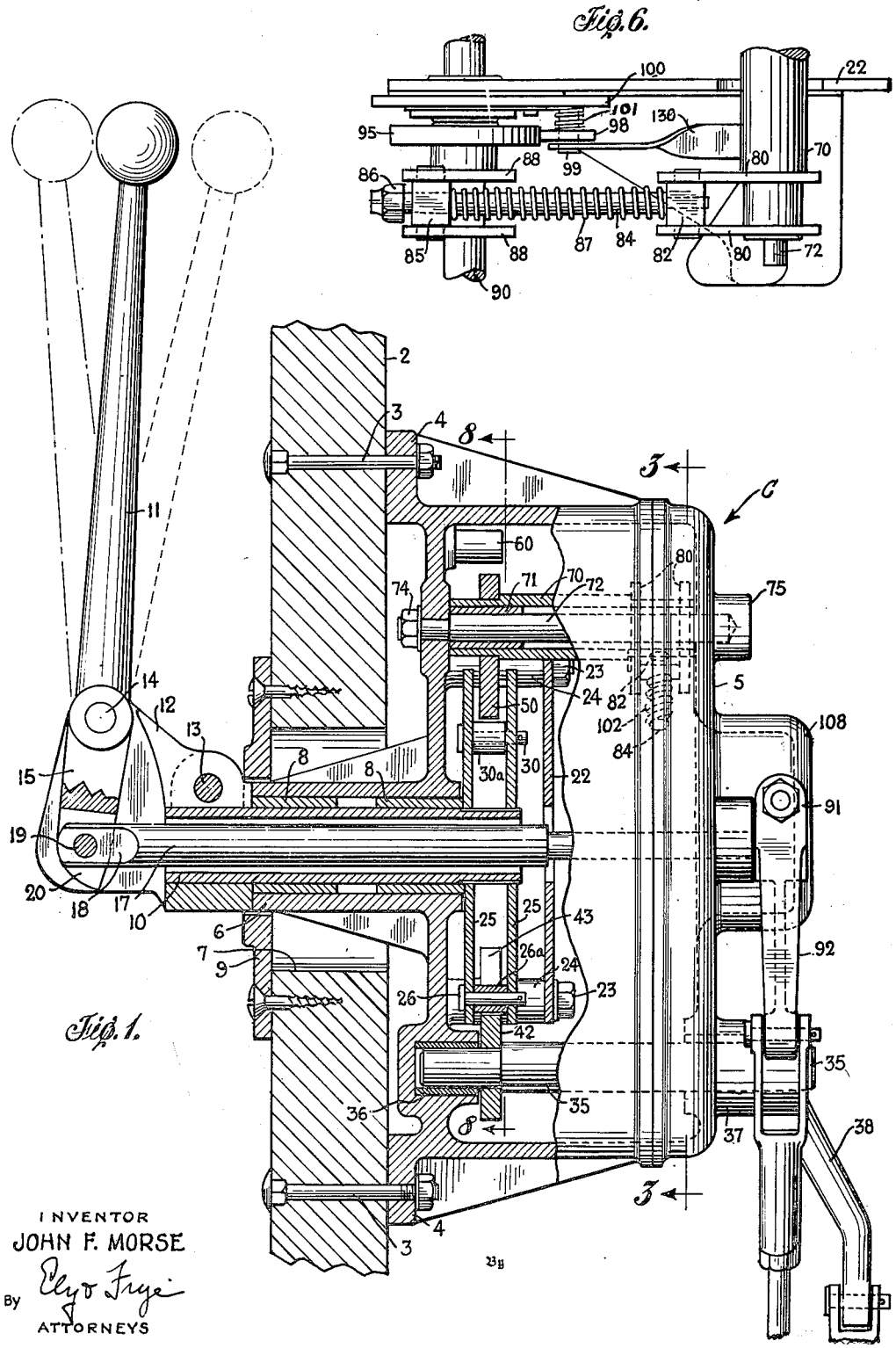
Fig. 1 is a side view showing the control mechanism mounted in a boat, a portion of this view being in section.
Fig. 6 is a partial section on the line 6—6 of Fig. 3 looking downwardly as indicated by the arrows.

Referring to Fig. 12, the control unit which is indicated as a whole at C is mounted on a pedestal or panel 2 located in the cabin of the boat convenient to the pilot. The engine is designated at E and the throttle at T. S indicates a servo-motor unit of any well-known type which operates the reverse gear of the power plant. T' indicates the connection going to the throttle and S' the connection going to the servo-motor or to the reverse gear directly if equipped with a so-called hydraulic reverse gear. These connections may be of the push-pull cable type or may be replaced by a positive mechanical connection or by a simple hydraulic system.

The main housing of the control unit is a box 1 which is secured to the rear of the support 2 by bolts 3 passing through lugs 4 cast with the box. The rear side of the housing is closed by a removable cover plate 5 which is fastened to the rim of the box in any suitable manner.

The front wall of the box is formed with an integral bearing sleeve 6 which extends through an opening 7 in the support 2, the space around the sleeve being closed by a plate 9. Located centrally of the sleeve 6, and supported thereby for rotation on bushings 8, is a hollow shaft 10, the inner end of which extends for a short distance into the interior of the housing, and the outer end of which extends beyond the support a sufficient distance to receive a split clevis 12 that is clamped to the projecting end of the shaft 10 by a bolt 13.

In the clevis 12 is pivoted the single-control lever 11 by manipulation of which the several functions are performed. This lever is pivoted at 14 to the clevis and is provided with a lower extension 15 which moves in the clevis and is provided with a fork indicated at 20.

Located in the hollow shaft 10 and along the axis thereof is a second shaft or rod 17, the outer end of which is flattened as at 18 to be received in the fork 20 to which it is connected by a pin 19.

It will be seen that the lever 11 has movement in two planes at right angles to one another. When rocked fore and aft or at right angles to the plane of Fig. 1 this lever controls the reverse gear and rocks the hollow shaft 10 in its bearing sleeve 6. As shown in Fig. 8, the movement of the lever corresponds to the direction in which it is desired that the boat should travel, movement to the left from vertical shifting the transmission to reverse and movement to the right shifting to forward. After the transmission has been fully engaged in either direction, continued movement in the same direction will open the throttle. Under ordinary operations, cruising speed is governed by the movement of the lever in the same plane. When, however, the lever 11 is shifted sideways about the center 14 this will move the rod 17 to the right or left in the hollow shaft 10 and either sideways movement may be executed while the lever is in any fore-and-aft position. The lever is so designed and the connections thereto are such that movement from vertical to the left as shown in Fig. 1 will actuate the connection T' to open the throttle, this being normally used to prime the engine for starting. Movement from the vertical to the right in Fig. 1 is availed of the release or "kick off" the high-idling speed so that the motor may operate at low-idling speed. While movement from vertical toward the left may be used to control the speed of the boat during cruising, this is not its usual purpose and in practice this operation will be employed only for starting the engine.

Located midway of the housing is a central plate or web 22, the configuration of which is shown in Fig. 3. This plate is carried on the front wall of the housing by bolts 23 which enter posts 24 rising from the wall. This plate serves to support certain of the operating mechanism.

Fore-and-aft movement of lever 11

The inner end of the hollow shaft 10 which projects into the housing is reduced slightly and keyed or force-fitted on this end of the shaft are two spaced circular plates 25 which are held together by three pins 26, 27 and 28 arranged at approximately 120° apart near the edges of the plates. The plate assembly 25 and its associated parts may also be termed as "squirrel-cage" and this expression will be used where the entire assembly is referred to. The pins 26, 27 and 28 carry rollers 26ª, 27ª and 28ª, respectively, which constitute the means for shifting the Geneva cams which actuate the clutch arm and the throttle arm, as will be described. Also located between the plates 25 and set in somewhat are groups of pins 30 arranged equidistantly from the center of the plates, and on these pins are mounted rollers 30ª which serve to hold the Geneva cams in their correct positions. As shown in Figs. 8 to 11, a set of four rollers 30ª is located at the top of the plates when the lever 11 is in neutral and two sets of two rollers are arranged on either side of the pin 26 at the bottom of the plates.

Located below the squirrel cage is a shaft 35, the outer end of which is reduced and mounted in a bearing 36 in the wall of the housing 1. The other end of this shaft is received in a bearing 37 in the cover 5 and to the outer end of this shaft is attached by the split sleeve 40 to the lever arm 38 which is connected to the reverse gear-operating connection S'.

Force-fitted and welded on the reduced portion of the shaft 35 and against the shoulder formed thereby is the single Geneva cam 42, the enlarged portion of which extends between the plates 25 where it is provided with a radial slot 43. On either side of the mouth of the slot the edge of the cam is formed with the two arcuate surfaces 44. When the lever 11 is vertical and the reverse gear is in neutral the roller 26ª lies at the base of slot 43. As the lever 11 is shifted to the right or left the roller 26ª will turn the cam and the shaft 42 and just before the roller leaves the slot, one or other of the sets of two rollers 30ª rides either of the surfaces 44 holding the cam and the shaft in their extreme positions. Two pins 45 and 46 mounted in the wall of the housing project into the path of the cam and serve as stops to arrest the cam at the extremes of its movement, which are the points at which the transmission is engaged.

As explained above at the time the transmission is engaged, whether in going from neutral into forward or neutral into reverse, the engine is at high-idle speed or accelerated to that point. The actuation of the throttle control is done by a second Geneva cam 50 located diametrically opposite the cam 42 and having its inner portion projecting between the plates 25.

This cam 50 is a double cam having two oppositely directed radial slots 51 and 52 between which the edge of the cam is formed with an arcuate surface 53 which in the neutral position is engaged by the set of four rollers 30ª at the top of the squirrel cage which serve to hold the cam in this position until it is turned by either roller 27ª or 28ª.

In going from neutral to reverse, as indicated by the arrow in Fig. 9, the roller 28ª enters the slot 51 at about the instant the cam 42 and shaft 35 have moved to their limit. Continued movement of the lever 11 rocks the cam 50 in clockwise direction until it strikes the pin 59 mounted in the wall of the housing and acting as a stop to limit the opening movement of the throttle. On going from neutral to forward the pin 27 engages the slot 52 and turns the cam 50 in the opposite direction until it reaches the stop pin 60.

In order to detain the plate assembly 25 in its three positions of neutral and extreme right and left, the edge of the outer plate 25 is formed with three notches 62 located at positions corresponding to neutral and extreme forward and reverse. When in these positions the notches 62 are engaged by a roller 63 mounted on the free end of a catch lever 64 which is pivoted to the wall of the housing at 65. Spring pressure is exerted on the lever 64 to hold the roller 63 against the edge of plate 25 by a spring 66 which surrounds a pin 67 pivoted at one end to the lever 64, the other end of the pin being received in a socket 68 formed in the side of the housing 1.

The double cam 50 is force-fitted and welded on the reduced forward end against the shoulder formed thereby of a hollow shaft 70 which is mounted on bushings 71 on either end of a fixed shaft 72, one end of which is reduced and held in the wall of the housing by the nut 74. The other end of shaft 72 extends into the cover where it is received in a boss 75.

The rear end of the hollow shaft 70, or that portion lying immediately within the cover 5 is likewise reduced, and on this reduced end are force-fitted and welded two spaced, parallel arms or plates 80 which move in a restricted arc in response to the rocking of the cam 50, which begins at the moment that the transmission goes into forward or reverse.

The free ends of the arms 80 carry a pivoted block 82, in which is slidably mounted the reduced end of a link 84, the other end of which is slidably received in a block 85 which is pivoted between the ends of two parallel rocker arms 88. A nut 86 is threaded on the end of the link 84 and a coil spring 87 surrounding the link presses against the blocks 82 and 85 and thus urges the rocker arm to its extreme limit of movement toward the left in Fig. 3 where the block 85 would rest against the nut 86. The assembly consisting of the arms 80, the push-and-pull link 84 and the block 85 is actuated whenever the hollow shaft 70 is rocked on either side of its neutral position, the rocker arms 88 being moved in the direction of the arrow applied thereto in Fig. 3 to open the throttle. If rocker arms 88 are held as shown in Fig. 3 the arms 80 may still function without moving the rocker arms until the nut 86 reaches the block 85, the link 84 merely sliding through the block 85 during this stage. The energy thus stored in the spring 87 will restore the rocker arms 88 to their extreme position when the holding force is released.

It will be noted in Figs. 3 and 6 that the nut 86 has been backed off on the end of the rod 84 to leave a slight space. This is indicative of the setting of the "high-idle" speed and unless the high-idling mechanism is released the arms 88 will return only to a point short of their full possible extent of travel. However, the instant that the "high-idling" detent is released the spring 84 will move the block 85 against the nut 86 which will shift the rocker arms 88 to the "low-idling" position.

The rocker arms 88 are fixed to a throttle-control shaft 90 which extends from the wall of the housing, through the web 22 and out of the cover 5. To the rearwardly extending end of this shaft is attached, by the split collar 91, the throttle control arm 92 which is attached to the connection T' from the throttle.

*The "high-idling" mechanism*

Secured to the shaft 90, here shown as in a location adjacent the rocker arms 88, is a disk 95 having a notch 96 cut in the edge thereof. Engaging the notch 96 is a stout pawl 98 which is pivotally mounted on a pin 99 mounted on the end of a lever arm 100. A coil spring 101 wrapped about the pin 99 and bearing at its ends against pins 102 on the arm 100 and on the pawl 98, urges the lower end of the pawl toward the disk 95. Because the disk 95 is secured to the shaft 90, the pawl 98 will arrest the counterclockwise movement of the shaft, which is the movement corresponding to the closing of the throttle, depending upon the point where the pawl is located. As explained above, this is at a point which will arrest the closing movement of the throttle somewhat short of its complete closure, and thereby assure the high-idling speed during shifting of the reverse gear.

In order to be able to adjust the high-idling speed, the arm 100 is rotatably mounted on the shaft 90 and in the lower side of the plate below the shaft is the pivoted block 103 in which is screw-threaded the inner end of an adjusting screw 105 which is mounted for rotation in the side of the housing and is provided with a knob 106 by which the screw may be rotated. A coil spring 107 between the block 103 and the side of the casing urges the plate 100 to the right. By rotation of the knob 106 the pawl will be shifted around the shaft and thus the point may be adjusted at which the disk 95 and shaft 90 are arrested on closing movement of the throttle by the engagement of pawl 98 with notch 96. It will be observed, however, that movement of the arms 80 in either direction will, after the gap between the nut 86 and block 85 is closed, move the rocker arms 88 in clockwise direction so that the speed of the engine may be advanced beyond the "high-idling" speed. This movement is obtained by further movement of the lever 11 in either direction which, through the plates 25 and Geneva cam 50, rocks the hollow shaft 70, the motion being transmitted to the rocker arms 88 by the link mechanism which has been described.

"High-idling" release

The "high-idling" speed is released or "kicked off" by rocking the lever 11 to the right about the pivot 14, as shown in Fig. 1. The movement of the lever will shift the rod 17 to the left, the cover 5 being provided with a recess or bay 108 to accommodate the rod 17 at its extreme inward point.

Attached to the rear of the central plate or web 22 are two parallel plates, a lower plate 110 and an upper plate 111 held in spaced relation by pillars 112 located at the corners of the plates. The plates constitute a sub-frame for housing the mechanism to be described and are fastened to the web 22 in a direction downwardly inclined, as shown in Fig. 3, by screws 115.

The rod 17 extends through the web 22 and lies between these plates 110 and 111, the inner end of the rod being reduced and screw-threaded at a point adjacent the inner edges of the sub-frame. On the end of the rod is a nut 116 which holds a circular disk 118 against a shoulder on the end of the rod (Fig. 5).

Flanking the plates 111 are two similar triangular plates 120 which are pivoted near the edges of the subframe, on the ends of a vertical pin 121 set in the plates 110 and 111. Corners of the plates 120 project over the edges of the plates 110 and 111 at points adjacent the disk 118 and at these points short pins 124, Fig. 5, project behind and in the path of the disk 118. On the inner corners of the plates 120 is located a heavier pin 125 which is connected to both plates 120 and moves through slots 126 in the plates 110 and 111. Pivoted to the upper projecting end of the pin 125 is a link 130 which is twisted at right angles and extended to the lower end of the pawl 98, where it is received over a pin 131 mounted on the lower end of the pawl. The end of the link adjacent the pawl is slotted at 132 where it goes over the pin 131 so that, while the pawl may ride freely over the surface of the disk 95, movement of the link 130 to the right will lift the pawl out of engagement with the notch 96, which will permit the rocker arms 88 and the shaft 90 to move counterclockwise under the impulse of the spring 87 bringing the throttle to its "low-idling" position, which may be termed "extreme low."

The above recited action which releases the "high-idling" is brought about by moving the lever 11 to the right, which draws the rod 17 to the left and this, through the action of the disk 118, rocks the plates 120 which, through link 130, releases the pawl 98.

Behind the disk 118 there is located on the shaft 17 a flanged sleeve 135 and between this sleeve and a second sleeve 136 is a coil spring 138 which urges the shaft 17 inwardly. The sleeve 136 is arrested by a block 140 slidably mounted over the shaft 17.

Actuation of throttle independently of the transmission

It is necessary to provide for opening the throttle for starting the motor and this operation is performed by moving the lever 11 toward the left about the pivot 14. As the movement of the lever in the manner indicated is wholly independent of the clutch-operating mechanism, the engine may be accelerated at any time during the operation of the boat, but the normal way of controlling the speed of the engine is by a continuation of the movement of the lever 11 fore-and-aft after the transmission has been fully engaged.

The block 140, to which reference has been made, rests against a shoulder 148 at the point where the rod 17 passes through the aperture 149 in the web 22. The upper and lower sides of this block are provided with pins 150 which enter and are pivoted in the ends of two parallel triangular plates 152 which together form a lever for actuating the throttle-control shaft 90.

The composite lever 152 is pivoted about a pin 154 located near the left-hand corner of the sub-frame 110—111 and is urged in a clockwise direction as viewed in Fig. 4 by a spring 155 wrapped about the pin 154 and bearing at one end against the adjacent pillar 112 and a pin 156 on the composite lever. The lever is provided with a shoulder 157 which is held against the web 22 so as to limit the outward movement of the rod 17.

The composite lever 152 is provided at its inner end with a transverse pin 160 over which is received the end of a link 162, a coil spring 164 pressing this end of the link against a washer 165 on the pin 160. The connection between the link 162 and the pin 160 is sufficiently loose to permit the link to rock. The link is twisted as shown in Figs. 3 and 4 and the vertical portion thereof is received between the lower ends of the rocker arms 88. At this point the link 162 is provided with an elongated slot 168 through which passes a pin 169 which traverses the lower ends of the arms 88. A coil spring 171 surrounding the pin 169 presses the free end of the link 162 against a washer 172 resting against the inner surface of one of the rocker arms 88.

It will be noted that when the elements are in the position shown in Fig. 3, which is at the position they will assume when the engine is running at "high idle," the pin 169 is spaced from the right hand, or inner end, of the slot 168 a distance corresponding to the space between the block 85 and the nut 86, therefore the link 162 will not prevent the arm 88 from moving in a counterclockwise direction whenever the pawl 98 is released to reduce the speed of the engine to "low idle." This condition will always be present at whatever degree the "high idling" may be set by the rotation of the arm 100 because the pin 169 moves with this setting. The slot 168 is of sufficient length, however, to permit the rocker arm 88 to move to its fullest extent so that it does not interfere with attaining the maximum engine speed.

It will be seen that as the rod 17 is moved inwardly, the movement of the block 140 rocks the lever 152 in a counterclockwise direction, as viewed in Fig. 4, which shifts the link 162 to the left and through the pin 169 rocks the arm 88 in a clockwise direction to open the throttle through rotation of shaft 90. In the movement the block 85 moves over the push rod 84. The inward movement of the rod 17 does not affect the trip mechanism for releasing the high idle because the disk 118 moves away from the pins 124. During this operation the pawl 98 rides up out of the notch 96, as it is permitted to do by the slot 132 but immediately drops into the notch as soon as the parts are returned to the position shown in Fig. 3.

Résumé

Assuming that the engine is to be started and that the parts are therefore in the position shown in the several views, the pilot shifts the lever 11 to the left as shown in Fig. 1, which shifts the rod 17 to the right and through the mechanism just described rocks the composite lever 152 counterclockwise, which opens the throttle sufficiently to prime the engine. The extent of this movement is limited because the lever 152 will ultimately strike the pin 125, but the extent of movement is more than ample to provide for priming under any condition. The engine having been started and, because the arms 88 are held in the position shown in Fig. 3, it will run at "high idling" speed. If the pilot is not ready to start out and wishes to let his engine idle, he shifts the lever 11 to the right, which by shifting the rod 17 to the left, actuates the plates 120 which through the link 130 raises the pawl 98 and the engine slows down into "low idle" due to the movement of the rocker arms counterclockwise under the force of the spring 87.

When the pilot releases the lever 11 after releasing the "high idle" pawl, the lever is restored to vertical position by the coil spring 138, which causes the pawl to rest upon the edge of the disk 95, but below the notch 96.

When the pilot is ready to start the boat he shifts the lever 11 forward or reverse, depending upon the direction in which he desires to move. Movement of the lever fore or aft through the action of the hollow shaft 10 and the squirrel cage first rotates the single Geneva cam 42, which, through shaft 35, shifts the reverse gear. The movement of the shaft 35 is arrested, when the reverse gear is shifted, by the pins 45 or 46, but at this moment either the roller 27ᵃ or the roller 28ᵃ is entering one of the slots 51 or 52 on the large Geneva cam 50 and this operation through the arms 80, rod 84 and rocker arms 88 rocks the shaft 90 to open the throttle. Shortly after the shaft 90 has started to move in a clockwise direction the pawl 98 passes over the notch 96 and rides on the disk 95 above the notch but in position to drop into the notch and arrest the return movement of the shaft 90 at "high idle."

Due to the cooperation of the elements just recited, the engine is speeded up after the reverse gear is engaged. The pilot then continues to control the speed of the engine by movement of the lever 11 in the fore-and-aft plane, the rocker arm 88 moving in response to the lever 11.

If the pilot wishes to reverse the direction of the boat, whether from forward to reverse or reverse to forward, he shifts the lever 11 accordingly, but the shaft 90 will be held at "high idle" while the lever 11 is passing through neutral because the pawl 98 drops into the notch 96 and this arrests the return movement of the shaft 90 at the selected point. The pilot is therefore assured that at the time he reverses the direction of the boat the engine is running at a sufficiently high speed to prevent stalling, even under the most severe forces exerted by the change in propeller direction.

Thus, the major purposes of the invention are achieved and the pilot may meet any emergency without danger of the engine stalling. However, the mechanism does not interfere in any way with the full control of the boat or engine. The "high-idling" speed may be selected to suit the requirements of any engine by manipulation of the knob 106.

The device shown and described herein is the first practical mechanism, so far as known, which provides a device having a single operating lever that will control both the throttle and reverse gear of a marine engine.

While it has especially adaptability and utility in connection with the operation of marine engines, it is not necessarily confined to this particular field but may have adaptations in other fields as well.

While a particular embodiment of the invention has been shown, other modifications are possible, and I do not desire that it be limited except as shall appear from the spirit and scope of the appended claims.

What is claimed is:

1. A unitary device for controlling the reversible transmission and the throttle of an engine, said device comprising a manually operated arm movable in two planes, a rotatable shaft, an operative connection for the shaft and the transmission, a second rotatable shaft, an operative connection for the second shaft and the throttle, and means connected to the arm and movable during a single operation thereof in one plane to rotate the first-named shaft to shift the transmission from forward through neutral to reverse, said means also acting to rotate the second-named shaft to close the throttle during the interval that the transmission is being shifted and to open the throttle after the transmission is engaged either in forward or reverse, and additional connections between the arm and the second-named shaft operative by movement of the arm in the other plane to rotate the second-named shaft without rotating the first-named shaft.

2. A unitary device for controlling the reversible transmission and the throttle of an engine, said device comprising a manually operated arm, a shaft, an operative connection for the shaft and the transmission, a second shaft, an operative connection for the second shaft and the throttle, means connected to the arm and movable during a single operation thereof to move the first-named shaft to shift the transmission from forward through neutral to reverse, said means also acting to move the second-named shaft to bring the engine to speed above its extreme low and hold it at that speed during the period that the transmission is being shifted, but to open the throttle progressively as the arm is moved toward its extreme positions after the transmission has been shifted, and means operated by the said arm to reduce the speed of the engine to extreme low.

3. A unitary device for controlling the transmission and the throttle of an engine, said device comprising a single lever, a single mechanism connected to the lever to actuate the transmission, and to open and close the throttle, said mechanism including means to shift the transmission from forward to reverse during an intermediate period in the movement of the lever, and also including means to bring the throttle to a position above its extreme low and hold it in that position during said intermediate period, but to open the throttle as the lever passes beyond said intermediate period, and means actuated by the said device to release the throttle and cause it to move to its extreme low position.

4. A single control unit for an engine having a throttle and a reversible transmission, said unit comprising a single manually operated device, connections from said device to the throttle and connections from said device to the transmission, said connections being operative at different periods during the operation of said device to open and close the throttle and to shift the transmission, detaining means to hold the throttle at a point short of extreme low during shifting of the transmission, and means operated by said device to release the said detaining means without disturbing the transmission.

5. A single control unit for an engine having a throttle and a reversible transmission, said unit comprising a single pivoted lever, connections from said lever to the throttle to open and close the throttle and connections from the lever to the transmission to shift it from forward to reverse, detaining means operative to hold the throttle at a point short of extreme low during the period that the transmission is being shifted by the lever and means operated by said lever to release the detaining means without disturbing the transmission.

6. A single control unit for an engine having a throttle and a reversible transmission, said unit comprising a single manually operated device, connections from said device to the throttle and connections from said device to the transmission, said connections being operative at different periods during the operation of said device to open and close the throttle and to shift the transmission, and a detent to hold the throttle at a point short of extreme low during shifting of the transmission, and means to release the detent and permit the throttle to move to its extreme low without disturbing the transmission.

7. A single control unit for an engine having a throttle and a reversible transmission, said unit comprising a single pivoted lever, connections from said lever to the throttle to open and close the throttle, and connections from the lever to the transmission to shift it from forward to reverse, and a detent operative to hold the throttle at a point short of extreme low during the period that the transmission is being shifted by the lever, and means to release the detent and permit the throttle to move to its extreme low without disturbing the transmission.

8. A single control unit for an engine having a throttle and a reversible transmission, said unit comprising a single lever mounted to move in two planes, connections from said lever for the throttle to actuate the throttle, and connections from the lever for the transmission to shift it from forward to reverse, both aforesaid connections being operable when the lever is moved in one of said planes, a detent operative to hold the throttle at a point short of extreme low during the period that the transmission is being shifted by the lever, and means operated by the lever when moving in the other plane to release the detent.

9. A single control unit for an engine having a throttle and a reversible transmission, said unit comprising a single lever pivotally mounted to move in two planes, connections from said lever for the throttle to actuate the throttle and connections from the lever for the transmission to shift it from forward to reverse only while the throttle is closed, both aforesaid connections being operable when the lever is moved in one plane, a detent associated with the said connections to the throttle and operative to hold the throttle at a point short of extreme low during the period that the transmission is being shifted, and means operated by the movement of the lever in the other plane to release the detent and permit the throttle to move to extreme low.

10. A control unit for an engine having a throttle and a reversible transmission, said unit comprising a single arm mounted to move in two planes, connections from the said arm for the throttle to open and close the throttle and connections from said arm for the transmission to shift the transmission, said connections being operative when the arm is moving in one plane only, and independent means to open and close the throttle when the arm is moving in the other plane.

11. A control unit for an engine having a throttle and a reversible transmission, said unit comprising a single arm mounted to move in two planes, connections from the arm for the throttle and the transmission, said connections being operative only while the arm is moving in one of said planes to shift the transmission and after the transmission has been shifted to operate the throttle, a detent to hold the throttle at a point short of its extreme low while the transmission is being shifted, means operated by the arm when moved in one direction in the second plane to release the detent and permit the throttle to move to its extreme low, and additional means operated by the arm when moved in the opposite direction in the second plane to actuate the throttle.

12. A control unit for an engine having a throttle and a reversible transmission, a manually operated arm, operative connections from said arm to the throttle and to the reversible transmission, means to hold the throttle at a point short of its extreme low during the shifting of the transmission, and means actuated by the arm to release the throttle-holding means without shifting the transmission.

13. A control unit for an engine having a throttle and a reversible transmission, a single arm movable in two planes, connections from the arm to the throttle and to the transmission and operative when the arm is moved in one plane to shift the transmission and actuate the throttle after the transmission has been shifted, means to hold the throttle at a point short of its extreme closed position while the transmission is being shifted and a release on the said means connected to the arm and operated thereby only when the arm is moved in the second plane.

14. A control unit for an engine having a throttle and a reversible transmission, a single arm movable in two planes, connections from the arm to the throttle and to the transmission and operative when the arm is moved in one plane to shift the transmission and actuate the throttle after the transmission has been shifted, means to hold the throttle at a point short of its extreme closed position while the transmission is being shifted and a release for the detent connected to the arm and operated thereby only when the arm is moved in the second plane, independently operated connections between the arm and the throttle to actuate the throttle when the arm is moved in the second plane.

15. A control unit for an engine having a throttle and a reversible transmission, an operating arm and operative connections from the arm to the throttle and the transmission, said lever in moving from one extreme to the other closing the throttle, shifting the transmission and then reopening the throttle and means operative to hold the throttle at a point short of its extreme low during the period that the transmission is being shifted, the connection from the lever to the throttle including a spring-pressed element, and means operative independently of the transmission to release said throttle-holding means to permit said element to move the throttle to its extreme low.

16. A control unit for the uses and purposes set forth comprising a lever, a hollow rotatable shaft to which said lever is attached, a pivotal mounting for said lever on which it may be rocked without rotating the hollow shaft, a rod connected to the lever and located in the hollow shaft, a disk secured to the hollow shaft, a throttle-operating shaft and a transmission-operating shaft, means on the disk to rotate the transmission-operating shaft and then the throttle-operating shaft, a detent engageable with the throttle-operating shaft to hold the said shaft at a point short of extreme low, and means actuated by the rod when moved in one direction by the rocking of the lever to rotate the throttle-operating shaft independently of the rotation of the hollow shaft.

17. A control unit for the uses and purposes set forth comprising a lever, a hollow rotatable shaft to which said lever is attached, a pivotal mounting for said lever on which it may be rocked without rotating the hollow shaft, a rod connected to the lever and located in the hollow shaft, a disk secured to the hollow shaft, a throttle-operating shaft and a transmission-operating shaft, means on the disk to rotate the transmission-operating shaft and then the throttle-operating shaft, a detent engageable with the throttle-operating shaft to hold the said shaft at a point short of extreme low, and means actuated by the rod when moved in one direction by the rocking of the lever to rotate the throttle-operating shaft independently of the rotation of the hollow shaft, and means actuated by the rod when moved in the other direction by the rocking of the lever to release the detent.

18. A device as described in claim 16 in which means is provided to adjust the location of the detent and thereby vary the point at which the throttle-operating shaft is held.

19. A device as described in claim 16 in which the detent is mounted to be moved about the throttle-operating shaft to vary the point at which the throttle is held by the detent.

20. A control unit for use with an engine having a throttle and a reversible transmission, comprising a manually operated arm, a throttle-operating shaft, connections between the arm and the throttle-operating shaft including a spring-held thrust member, a transmission-shifting shaft also operated by the arm, a detent engageable with the throttle-operating shaft and adapted to arrest its movement short of extreme low and thereby place the spring-held thrust member under load without preventing the movement of the arm and the shifting of the transmission, and means operative independently of the transmission for releasing the detent and thereby permitting the spring to move the throttle to extreme low.

21. A control unit as described in claim 20 in which the detent-releasing means is operated by manipulation of the arm.

22. A control unit as described in claim 21 in which the detent is adjustable relative to the throttle-operating shaft to vary the point at which the movement of the throttle is arrested.

23. A control unit for an engine having a throttle and a reversible transmission, and a single lever pivoted to rock in two planes, and operative connections between the lever and the throttle and the transmission constructed and adapted so that as the lever is moved in one plane the transmission is shifted and the speed of the engine controlled, means to arrest the closing of the throttle at a point short of extreme low, and means operated by the movement of the lever in the second plane to release the throttle-arresting means.

24. A control unit for an engine having a throttle and a reversible transmission, and a single lever pivoted to rock in two planes, and operative connections between the lever and the throttle and the transmission constructed and adapted so that as the lever is moved in one plane the transmission is shifted and the speed of the engine controlled, means to arrest the closing of the throttle at a point short of extreme low, and means operated by the movement of the lever in one direction in the second plane to release the throttle-arresting means and by movement of the lever in the opposite direction in the second plane to open the throttle.

25. In a control unit for an engine having a throttle and a reversible transmission, a rotatable shaft for actuating the throttle, and a rotatable shaft for actuating the transmission, a single manual control arm and means operatively connecting said arm and the transmission-actuating shaft whereby the transmission is shifted during movement of the control arm, an intermediate shaft between the control arm and the throttle-actuating shaft, operative connections between the control arm and the intermediate shaft to move the intermediate shaft after the transmission-actuating shaft has completed its movement, connections from the intermediate shaft to the throttle-actuating shaft, said last-named connections permitting a limited relative movement between the intermediate shaft and the throttle-actuating shaft, a detent to hold the throttle-operating shaft from movement during the period that the transmission is being shifted, and means to adjust the location of the detent relative to the throttle actuating shaft so that it will hold the throttle-operating shaft at a point short of extreme low.

26. In a control unit for an engine having a throttle and a reversible transmission, a rotatable shaft for actuating the throttle, and a rotatable shaft for actuating the transmission, a single manual control arm and means operatively connecting said arm and the transmission-actuating shaft whereby the transmission is shifted during movement of the control arm, an intermediate shaft between the control arm and the throttle-actuating shaft, operative connections between the control arm and the intermediate shaft to move the intermediate shaft after the transmission-actuating shaft has completed its movement, connections from the intermediate shaft to the throttle-actuating shaft, said last-named connections permitting a limited relative movement between the intermediate shaft and the throttle-actuating shaft, a detent to hold the throttle-operating shaft from movement during the period that the transmission is being shifted, means to adjust the location of the detent relative to the throttle actuating shaft so that it will hold the throttle-operating shaft at a point short of extreme low, means to release the detent, and spring means to move the throttle-operating shaft to extreme low when the detent is released.

27. In a control unit for an engine having a throttle and a reversible transmission, a rotatable shaft for actuating the throttle, and a rotatable shaft for actuating the transmission, a single manual control arm and means operatively connecting said arm and the transmission-actuating shaft whereby the transmission is shifted during movement of the control arm, an intermediate shaft between the control arm and the throttle-actuating shaft, operative connections between the control arm and the intermediate shaft to move the intermediate shaft after the transmission-actuating shaft has completed its movement, connections from the intermediate shaft to the throttle-actuating shaft, said last-named connections permitting a limited relative movement between the intermediate shaft and the throttle-actuating shaft, a detent to hold the throttle-operating shaft from movement during the period that the transmission is being shifted, means to adjust the location of the detent relative to the throttle actuating shaft so that it will hold the throttle-operating shaft at a point short of extreme low, means to release the detent, and spring means to move the throttle-operating shaft to extreme low when the detent is released, and means actuated by the control arm for moving the throttle-operating shaft without moving the intermediate shaft.

28. In an engine control, a throttle-control shaft, a transmission-control shaft, an intermediate throttle-control shaft, a hollow operating shaft, cam means between the operating shaft and the intermediate shaft, and between the operating shaft and the transmission-control shaft for rotation of the respective shafts in response to rotation of the operating shaft, the cam means for rotation of the intermediate shaft being engageable upon complete engagement of the transmission, means connecting the said intermediate shaft and the throttle-control shaft and comprising a link on dead center with respect to the intermediate shaft in neutral position of the operating shaft whereby rotation of the throttle-control shaft is rendered uni-directional regardless of direction of rotation of the operating shaft, and said link comprising a resilient element whereby the throttle is opened with positive action but closed by pressure of the resilient element, disengageable means for holding the throttle open at a position above normal idling speed against the bias of the resilient element, a rod movable in translation through the hollow operating shaft, a single control stick engaging the operating shaft to rotate the same about its axis, said stick attached to the rod and having a pivotal connection whereby to translate the rod through the shaft, a connection between said rod and said throttle-control whereby the throttle may be opened against the bias of the resilient means and independently of the said intermediate shaft, and a connection between said rod and said disengageable means for disengaging the same independently of throttle action.

29. In an engine control, a transmission control shaft and a throttle-control shaft, a hollow, rotatable operating shaft, an intermediate throttle-control shaft, cam means between said operating shaft and said intermediate shaft, and between said operating shaft and said transmission-control shaft to rotate the respective shafts, connecting means between said intermediate shaft and the throttle-control shaft to rotate the latter in response to rotation of the former, said connecting means comprising a link with a positive connection for opening of the throttle and a resilient connection for closing the same, a rod movable in translation through the said operating shaft, a single control member mounted for rotation of the operating shaft or translation of the rod, selectively, and means connecting the rod with the throttle-control means for actuation of the same against the bias of the resilient member.

30. A unitary device for controlling the reversible transmission and the throttle of an engine, said device comprising a manually operated arm movable in two planes, a rotatable shaft, an operative connection for the shaft and the transmission, a second rotatable shaft, an operative connection for the second shaft and the throttle, and means connected to the arm and movable during a single operation thereof in one plane to rotate the first named shaft to shift the transmission from forward through neutral to reverse, said means also acting to rotate the second named shaft to close the throttle during the interval that the transmission is being shifted and to open the throttle after the transmission is engaged either in forward or reverse, and additional means operative by the movement of the arm in the other plane to open the throttle without rotating the first named shaft.

31. A unitary device for controlling the reversible transmission and the throttle of an engine, said device comprising a manually operated arm movable in two planes, a rotatable shaft, an operative connection for the shaft and the transmission, a second rotatable shaft, an operative connection for the second shaft and the throttle, and means connected to the arm and movable during a single operation thereof in one plane to rotate the first named shaft to shift the transmission from forward through neutral to reverse, said means also acting to rotate the second named shaft to close the throttle during the interval that the transmission is being shifted and to open the throttle after the transmission is engaged either in forward or reverse, and additional means operative by the movement of the arm in the other plane to open or close the throttle without rotating the first named shaft.

JOHN F. MORSE.

REFERENCES CITED

The following references are of record in the file of this patent:

UNITED STATES PATENTS

| Number | Name | Date |
|---|---|---|
| 598,679 | Parker | Feb. 8, 1898 |
| 976,834 | Saurer | Nov. 22, 1910 |
| 1,089,615 | Wyman | Mar. 10, 1914 |
| 1,256,759 | Wilson | Feb. 19, 1918 |
| 1,620,649 | Hartz | Mar. 15, 1927 |
| 1,886,672 | Good | Nov. 8, 1932 |
| 1,891,678 | Maybach | Dec. 20, 1932 |
| 2,206,771 | Dugas | July 2, 1940 |
| 2,254,144 | Higgins | Aug. 26, 1941 |
| 2,257,852 | Nicol | Oct. 7, 1941 |
| 2,321,098 | Morse | June 8, 1943 |
| 2,336,682 | Gross | Dec. 14, 1943 |
| 2,388,357 | Hewitt | Nov. 6, 1945 |
| 2,404,545 | Stevens | July 23, 1946 |
| 2,480,521 | Thompson | Aug. 30, 1949 |